US011189148B2

(12) United States Patent
Reeder

(10) Patent No.: US 11,189,148 B2
(45) Date of Patent: Nov. 30, 2021

(54) PROXIMITY ALERT FOR ELECTRONIC DEVICES

(71) Applicant: Jennifer Reeder, Oceanside, CA (US)

(72) Inventor: Jennifer Reeder, Oceanside, CA (US)

(*) Notice: Subject to any disclaimer, the term of this patent is extended or adjusted under 35 U.S.C. 154(b) by 0 days.

(21) Appl. No.: 15/617,229

(22) Filed: Jun. 8, 2017

(65) Prior Publication Data

US 2018/0357877 A1    Dec. 13, 2018

(51) Int. Cl.
| | | |
|---|---|---|
| *G08B 21/02* | (2006.01) | |
| *H04B 1/3827* | (2015.01) | |
| *H04W 12/08* | (2021.01) | |
| *G08B 21/24* | (2006.01) | |
| *H04B 1/38* | (2015.01) | |
| *H04W 88/02* | (2009.01) | |
| *H04W 12/63* | (2021.01) | |

(52) U.S. Cl.
CPC ..... *G08B 21/0266* (2013.01); *G08B 21/0277* (2013.01); *G08B 21/0286* (2013.01); *G08B 21/24* (2013.01); *H04B 1/385* (2013.01); *H04W 12/08* (2013.01); *H04B 2001/3861* (2013.01); *H04B 2001/3894* (2013.01); *H04W 12/63* (2021.01); *H04W 88/02* (2013.01)

(58) Field of Classification Search
CPC ............ G08B 21/0266; G08B 21/0286; G08B 21/0277; H04B 1/385; H04B 2001/3894; H04B 2001/3861; H04W 12/08
See application file for complete search history.

(56) References Cited

U.S. PATENT DOCUMENTS

| | | | | |
|---|---|---|---|---|
| 2004/0183674 A1* | 9/2004 | Ruvarac | ............. | G08B 21/0266 340/539.13 |
| 2008/0001764 A1* | 1/2008 | Douglas | ............... | G07C 9/00111 340/573.1 |
| 2012/0242481 A1* | 9/2012 | Gernandt | ........... | G08B 21/0219 340/539.13 |
| 2015/0082406 A1* | 3/2015 | Park | ...................... | H04L 63/105 726/9 |
| 2016/0150362 A1* | 5/2016 | Shaprio | ................. | H04W 4/023 340/539.13 |
| 2016/0247378 A1* | 8/2016 | Baczuk | ................... | H04W 4/80 |
| 2016/0335876 A1* | 11/2016 | Verma | ..................... | G01S 11/06 |

FOREIGN PATENT DOCUMENTS

| | | | | | |
|---|---|---|---|---|---|
| SE | WO 2012/008905 A1 * | 1/2012 | | .......... | A44C 5/2042 |
| SE | WO 2012008905 A1 * | 1/2012 | | .......... | A44C 5/2042 |

* cited by examiner

*Primary Examiner* — Brian Wilson
(74) *Attorney, Agent, or Firm* — Furr Law Firm; Jeffrey Furr, Esq.

(57) ABSTRACT

The present invention is a device and system for a proximity alert band. The proximity band is a band that goes around a user wrist that matches up with one or more electronic devices. The bands will have a display unit, a wireless communication means, a battery and a proximity alarm. The proximity band will track the distance between it and the devices. Once a device gets a set distance away for the proximity band it will set off an alarm which can be visual, like a light, audio, like an alarm sounds, physical, like a vibration or any combination. The system may also turn off and lock the device.

6 Claims, 7 Drawing Sheets

PROXIMITY ALERT FOR ELECTRONIC DEVICES

CROSS-REFERENCES TO RELATED APPLICATIONS (IF ANY)

None

BACKGROUND

1. Field of the Invention

The invention relates to a proximity alert band that can track an electronic device, in more particularly to give an alarm when the distance exceeds a certain distance.

2. Description of Prior Art

In today's world, everyone is completely lose if they misplace or lose their phone or other such device as the new age is very dependent on technology. The phones are used as calendars, phone books, note pads, maps and information devices. Many times if a person loses their phone they have lost their next move forward. There exists a need to easily track your phone and to know where it is and turn it off if you are too far away.

There is still room for improvement in the art.

SUMMARY OF THE INVENTION

The present invention is a device and system for a proximity alert band which informs a people if their phone or electronic device is too far away from them.

The proximity band is a master band that goes around a user wrist that matches up with one or more electronic devices that the user wants to track their location and proximity of. The band will have a display unit, a wireless communication means, a battery and a proximity alarm. It would work via Bluetooth and is waterproof, rechargeable, and adjustable.

The proximity alarm band will track the distance between it and the electronic device or devices. Once the electronic device, such as a phone, is a set distance away from the band the band will set off an alarm which can be visual, like a light, audio, like an alarm sounds, physical, like a vibration or any combination. The user can set the alarm type that they want and they can even set the alarm so that it is unique for each device with an option of a unique sound or light or vibration pattern. The user can even have an option to turn the device off or lock it.

The current invention is more efficient, effective, accurate and functional than the current art.

BRIEF DESCRIPTION OF THE DRAWINGS

Without restricting the full scope of this invention, the preferred form of this invention is illustrated in the following drawings.

DESCRIPTION OF THE PREFERRED EMBODIMENT

Figure 1:
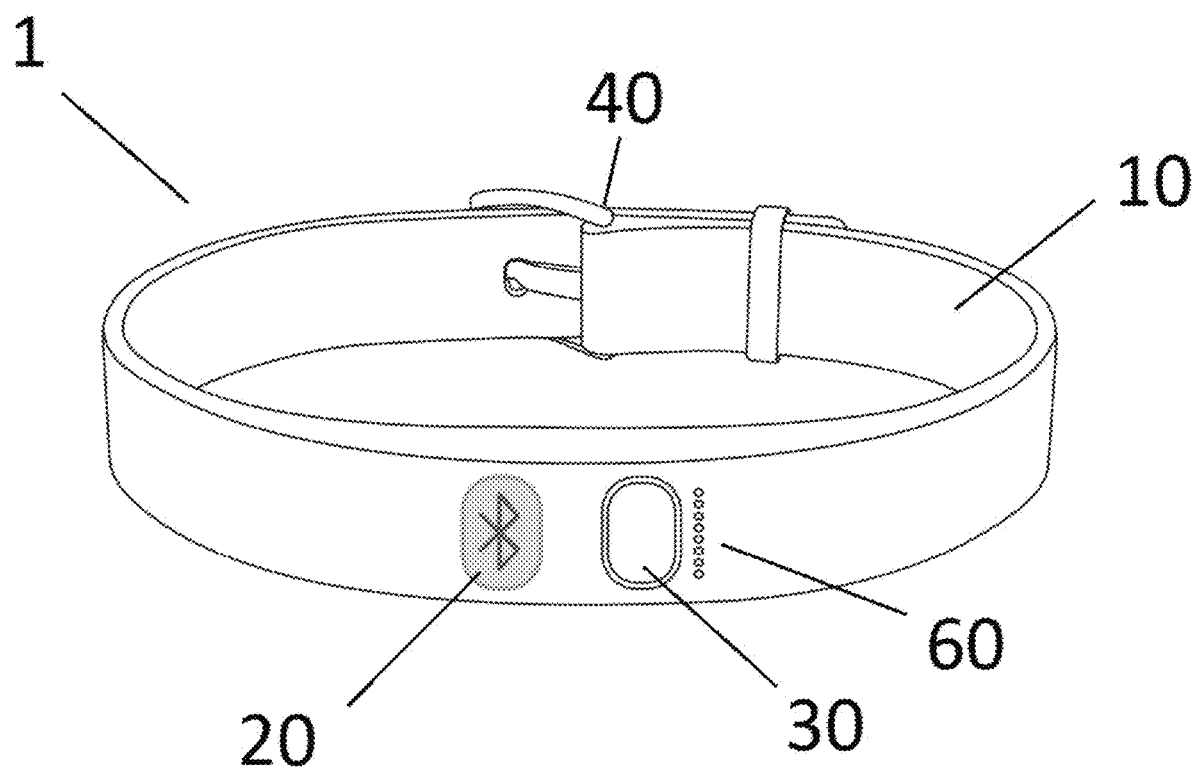
FIG. 1 shows a front view of the band.
Figure 2:
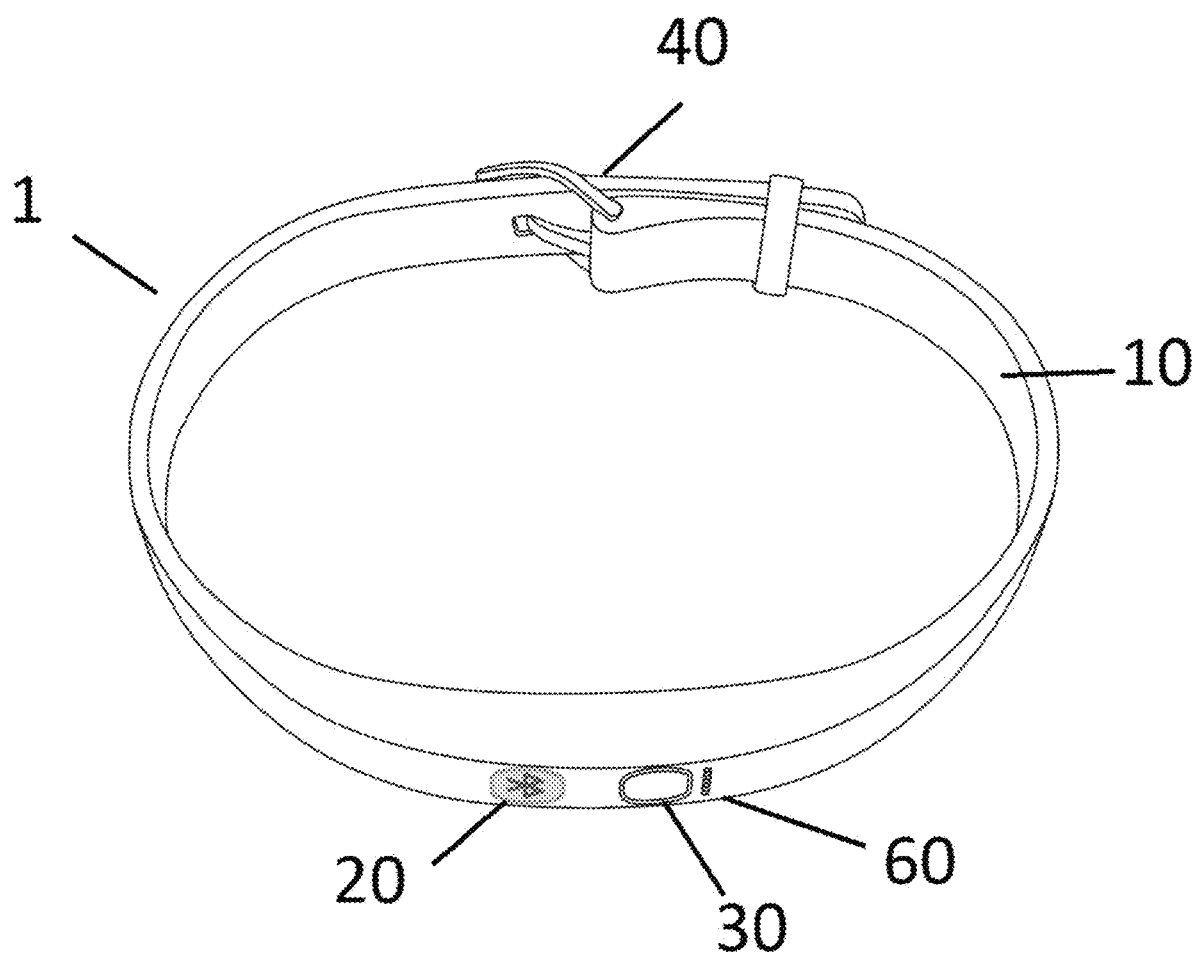
FIG. 2 shows a top view of the band.
Figure 3:
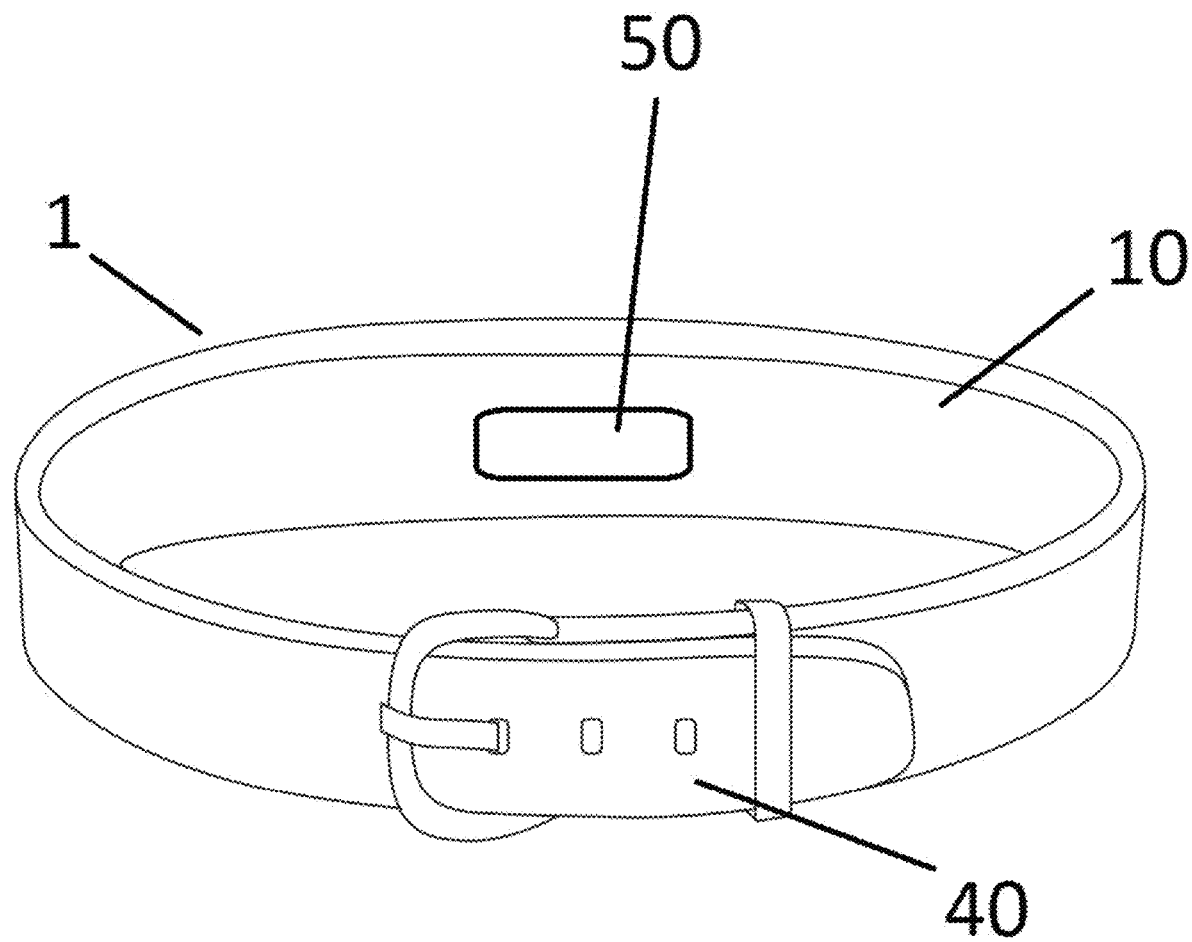
FIG. 3 shows the back of the band.
Figure 4:
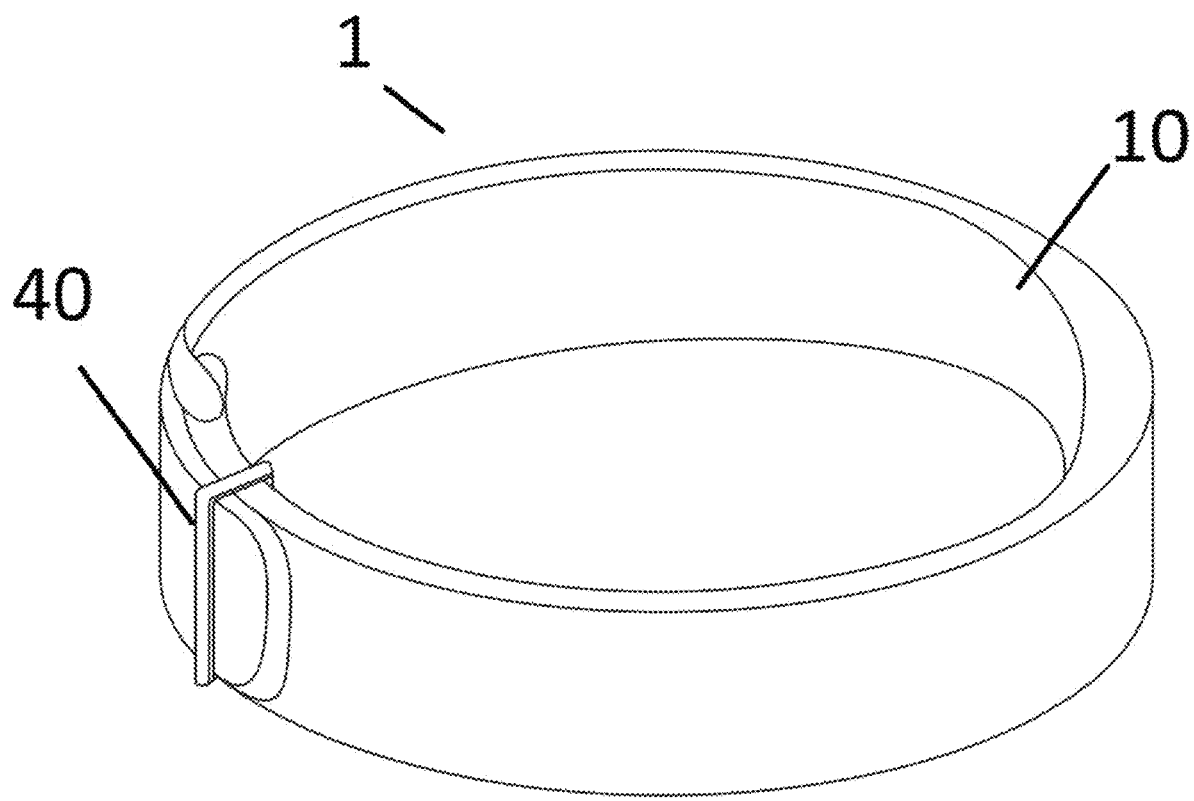
FIG. 4 show the right side view of the band.
Figure 5:
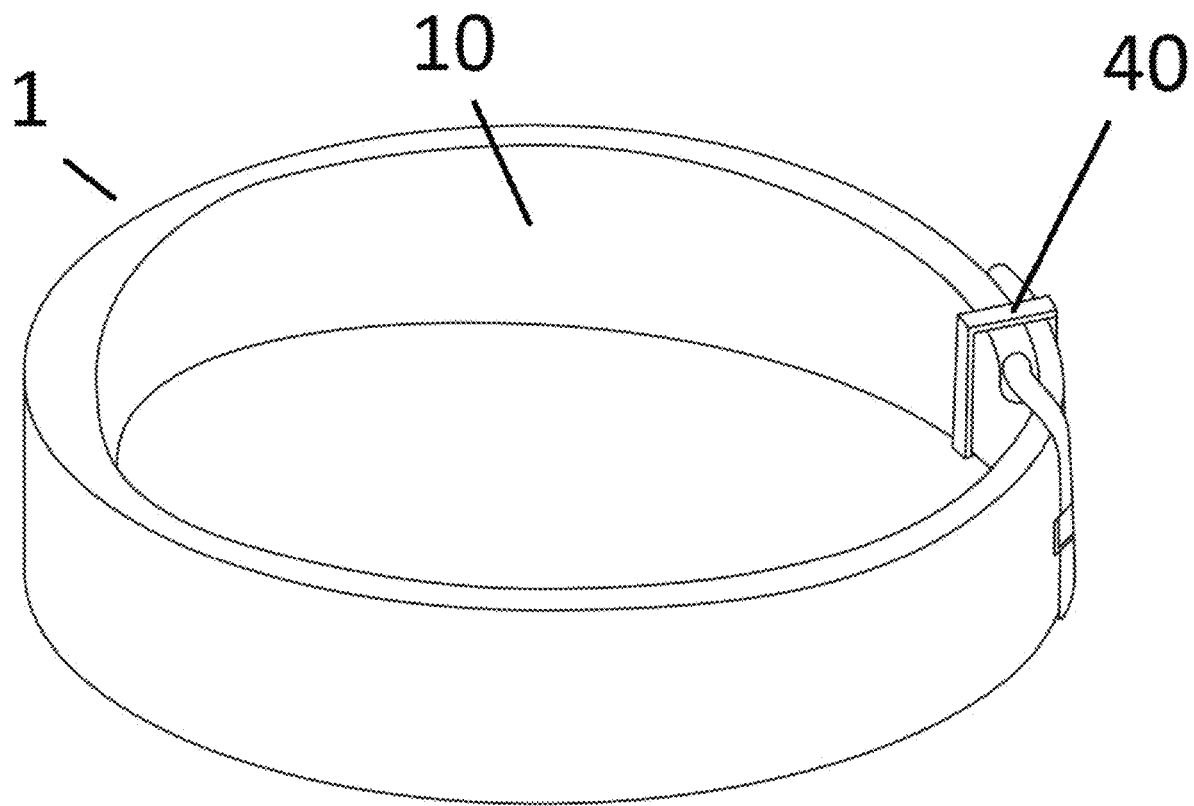
FIG. 5 shows the left side view of the band.

There are a number of significant design features and improvements incorporated within the invention.

As shown in FIGS. 1 through 6, the present invention is a device 1 and system for a proximity alert band which informs a people if they are a certain distance away from their phone or other electronic device or devices.

The proximity band 1 is a band 10 that goes around a user wrist that tracks the devices location and proximity of. The band 1 will have a display unit 30, a wireless communication means 20, a battery 50 and a proximity alarm 60.

As shown in FIGS. 1 through 5, the band 1 has a banding strip 10 made of a soft bendable material like rubber or plastic, it will have an attachment means like a belt buckle and hole connection means 40 or a plastic button means if meant to be attached semi-permanently so that it would need to be cut off. The proximity band 1 would be water proof or semi-water proof.

Figure 6:
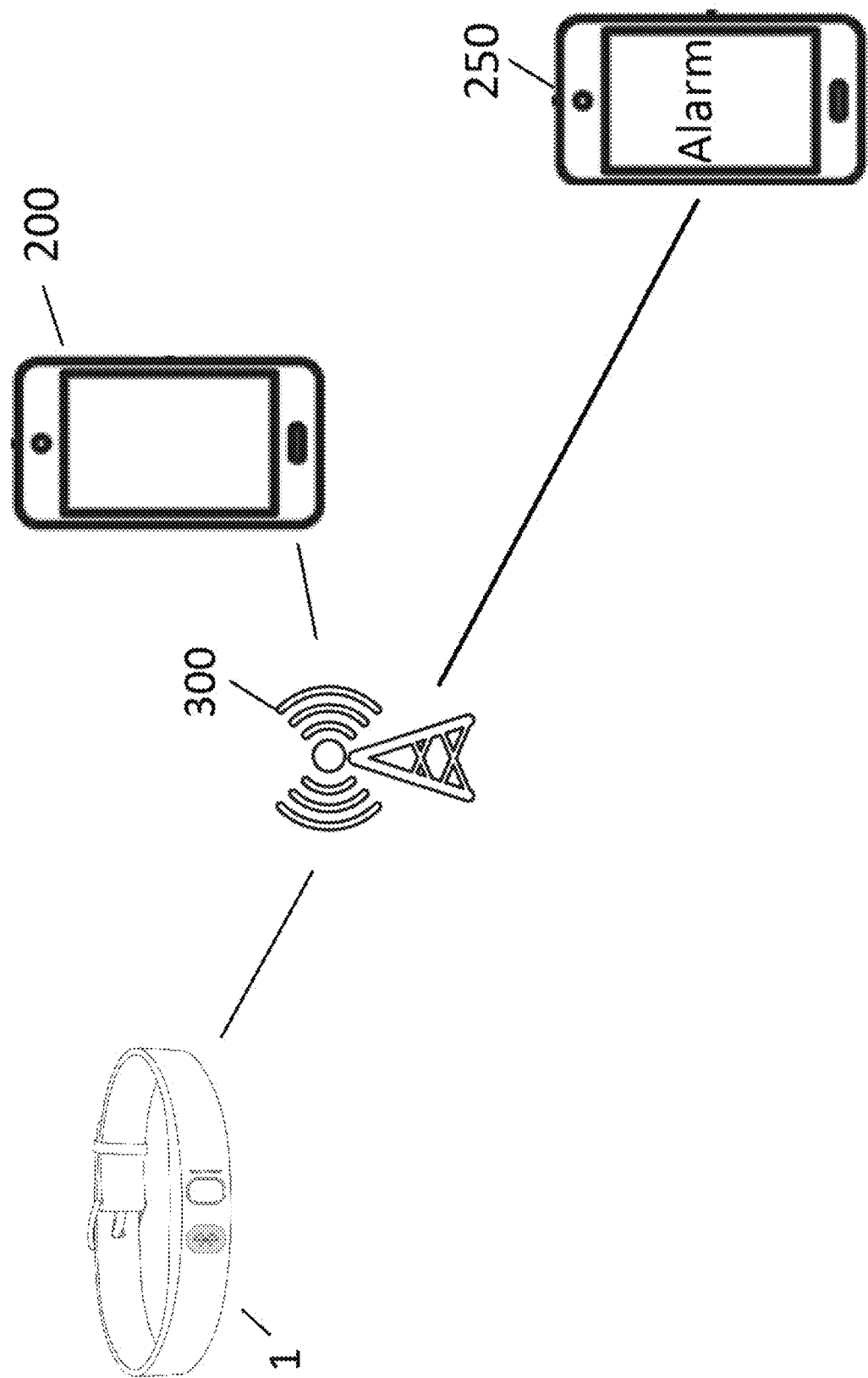
FIG. 6 shows the proximity alarm band being used.

As shown in FIG. 6, the proximity band 1 will track the distance between it and the electronic device 200 using a wireless communication system 300. As shown in FIG. 6, one device 200 is close to the proximity band 1 which doesn't set off the alarm 40 while the other one device 250 is farther away and sets off the proximity alarm 40.

Once the device 200 gets a set distance away from the proximity band 1 it will set off an alarm which can be visual, like a light, audio, like an alarm sounds, physical, like a vibration or any combination. The user can set the alarm type that they want and they can even set the alarm 60 so that it is unique for each device with an option of a unique sound or light or vibration pattern.

The system may also include the ability to turn off or lock the device 200 once is gets too far from the proximity band 1 or if the proximity band 1 is turned off The alarm 40 can even be set so that it goes to a smartphone or computing device 200 like a computer or tablet with a message informing them which device 200 is out of reach as shown in FIG. 6.

The device 1 would also have a smartphone app to go with it. It would work via Bluetooth and should be waterproof, rechargeable, and adjustable.

Figure 7:
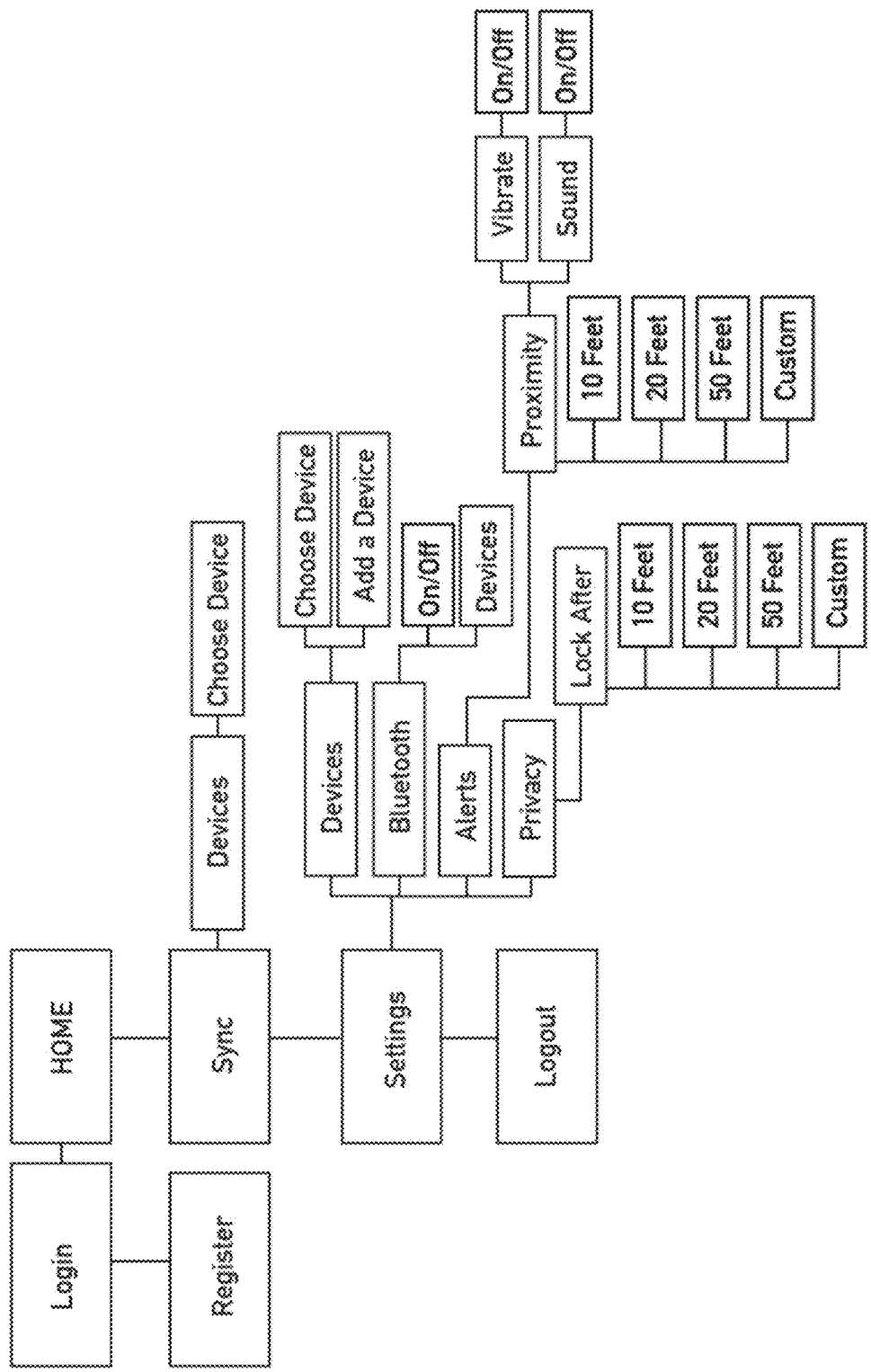
FIG. 7 shows a flowchart of the process.

The logic flow of the system is shown in FIG. 7. The system, data and processing code can reside in the non-transitory memory of the one or more computing devices. The system may work with a central server or in parallel which each computing device 200 or smartphone communicating with others within the system. Any programing language and operating system can be used to run the system.

The user Logs in the system and registers. The system would have a home page with sync, settings and logout options. The sync function will allow the user to sync the devices to the proximity band.

The settings function has the settings for the system. It allows the user to choose a device or add a device. It sets up the wireless function such as Bluetooth and turn it on and off. It sets up the alerts based on the proximity which can be set as the distance between the proximity band 1 and the device 200. It also allows the user to set what type of alarm such as vibrate and/or sound.

The privacy function will allow the user to set whether to lock the device 200 after a set distance between the proximity band 1 and the device 200.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided. With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

That which is claimed is:

1. A method comprising:
    providing a master band comprising a banding strip with an attachment means for attachment to a wrist of a user, an alarm, a display, a battery and a communication device configured to communicate via Bluetooth with at least one electronic device the user wishes to track, wherein one of the at least one electronic device the user wishes to track and that communicates with the master band comprises an application with sync, setting, logout and privacy functions;
    syncing the master band with one or more of the at least one electronic device the user wishes to track;
    setting a user defined distance for the one or more of the at least one electronic device the user wishes to track;
    setting, with the privacy function, whether or not the one or more of the at least one electronic device the user wishes to track will lock after exceeding the user defined distance;
    setting whether or not the one or more of the at least one electronic device the user wishes to track will turn off after exceeding the user defined distance;
    setting the alarm for the one or more of the at least one electronic device the user wishes to track, wherein the alarm for each of the one or more of the at least one electronic device the user wishes to track is unique and comprises any combination of unique audio, visual and vibration patterns;
    setting whether or not a message is to be remotely transmitted if the one or more of the at least one electronic device the user wishes to track exceeds the user defined distance;
    measuring a distance between the master band and the one or more of the at least one electronic device the user wishes to track;
    activating the alarm when the measured distance exceeds the user defined distance;
    locking or turning off, when set, the one or more of the at least one electronic device the user wishes to track when the measured distance exceeds the user defined distance; and
    locking or turning off the one or more of the at least one electronic device the user wishes to track when the master band is turned off.

2. The method according to claim 1 comprising: where the master band is waterproof, rechargeable and adjustable.

3. The method according to claim 1 comprising: where the alarm and the display are located on the front of the master band.

4. A system comprising:
    one of at least one electronic device a user wishes to track with a master band comprising:
        an application with sync, setting, logout and privacy functions;
        the sync function configured to sync the master band with one or more of the at least one electronic device the user wishes to track;
        the setting function configured to set a user defined distance for the one or more of the at least one electronic device the user wishes to track;
        the privacy function configured to set whether or not the one or more of the at least one electronic device the user wishes to track will lock after exceeding the user defined distance, wherein, if set, the one or more of the at least one electronic device the user wishes to track locks after exceeding the user defined distance;
        the setting function configured to set whether or not the one or more of the at least one electronic device the user wishes to track will turn off after exceeding the user defined distance, wherein, if set, the one or more of the at least one electronic device the user wishes to track turns off after exceeding the user defined distance;
        the setting function configured to set an alarm on the master band for the one or more of the at least one electronic device the user wishes to track, wherein the alarm for each of the one or more of the at least one electronic device the user wishes to track is unique and comprises any combination of unique audio, visual and vibration patterns; and
        the application is configured to set whether or not a message is to be remotely transmitted if the one or more of the at least one electronic device the user wishes to track exceeds the user defined distance;
    the master band comprising:
        a banding strip with an attachment means for attachment to a wrist of the user;
        the alarm;
        a display;
        a battery; and
        a communication device configured to communicate with the one or more of the at least one electronic device the user wishes to track via Bluetooth;
        wherein the master band measures a distance between the master band and the one or more of the at least one electronic device the user wishes to track; activates the set alarm when the measured distance exceeds the user defined distance; and locks or turns off the one or more of the at least one electronic device the user wishes to track when the master band is turned off.

5. The system according to claim 4 comprising: where the master band is waterproof, rechargeable and adjustable.

6. The system according to claim 4 comprising: where the alarm and the display are located on the front of the master band.

* * * * *